Sept. 2, 1952 — J. S. STONE — 2,608,789
DEMOUNTABLE CASTING PLUG
Filed Feb. 25, 1948
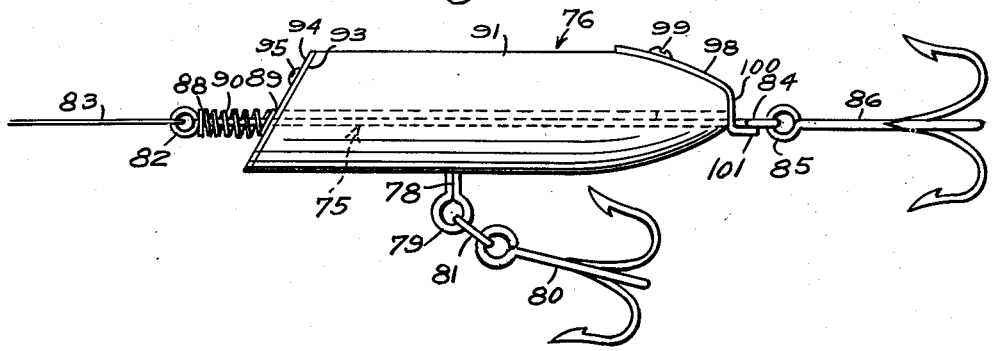
Fig. 1.
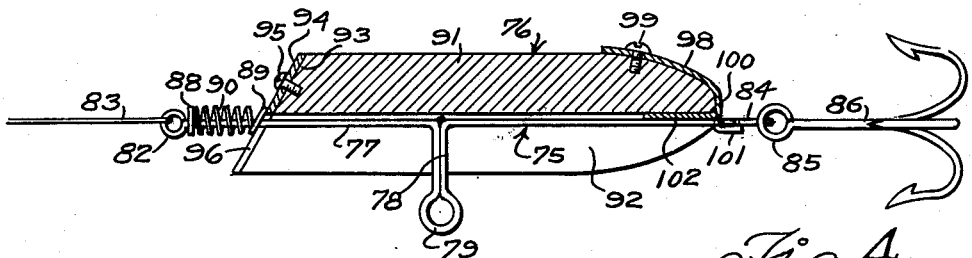
Fig. 2.
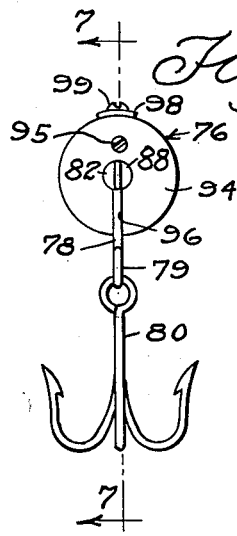
Fig. 3.
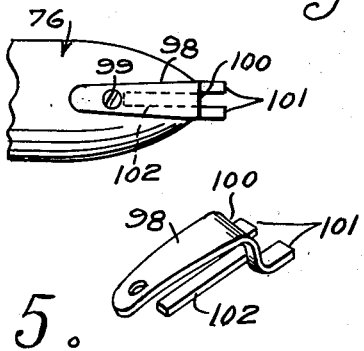
Fig. 4.
Fig. 5.
INVENTOR.
Jay S. Stone
BY Victor J. Evans & Co.
ATTORNEYS Patented Sept. 2, 1952

2,608,789

UNITED STATES PATENT OFFICE 2,608,789

DEMOUNTABLE CASTING PLUG

Jay S. Stone, Dolgeville, N. Y.

Application February 25, 1948, Serial No. 10,691

1 Claim. (Cl. 43—42.09)

The present invention relates to fish lures, and in particular to a demountable casting plug bait which can be conveniently and optionally changed to suit the various desires of the fisherman.

One object of the invention is to provide a casting plug bait including a flat frame structure for mounting fish hooks and the like which is adapted to be received in one of a large number of optionally useable bait plugs of various shapes and different colors to suit the prevailing fishing conditions and increase the fish-getting characteristics of the fish lure.

Another object is to provide a casting plug in which the bait plug is removably and demountably secured to the frame structure upon which the fish hooks are affixed, thereby enabling the fisherman to quickly and easily change the plug bait without necessitating laborious effort in the tying and untying of leaders and lines while changing from one type of plug bait to another.

Another object is to provide a casting plug fish lure in which the demountable plug bait can be quickly and tightly snapped into operative position, thus saving time when interchanging baits.

Another object is to provide a casting plug and fish lure in which a yielding spring detent is employed for retaining the bait plug in position on the casting plug frame in a positive and secure manner to thereby prevent the bait plug from becoming disengaged when a strike is encountered.

Another object is to provide a casting plug with a number of different types of bait plugs to simulate minnows, scorpions, bugs and other insect types.

Another object is to provide a casting plug fish lure in which the various strains on the bait are transferred to the casting plug frame structure such that pulling stresses on the bait plug will be eliminated and frequent resultant damage will be decreased.

Another object is to provide a fish lure and casting plug in which a large number of bait plugs can be conveniently carried by the fisherman with a single plug bait frame structure, thereby conserving space in the tackle box and eliminating a large number of plug baits with the hooks attached which frequently become entangled, requiring considerable time to untangle before the plug bait is accessible.

Other objects and advantages of the invention will become apparent during the course of the following description of the accompanying drawings wherein—

Figure 1 is a side elevational view of a preferred embodiment of the invention, employing a wire frame structure upon which the bait plug is removably supported.

Figure 2 is a longitudinal cross-sectional view taken through Figure 1, and showing various structural details of the casting plug.

Figure 3 is a front elevational view of the casting plug bait shown in Figures 1 and 2, illustrating the slotted nose plate and the manner in which the hooks are supported from the wire frame structure.

Figure 4 is a fragmentary top plan view of the rear portion of the casting plug showing the rear latch member for engaging and receiving the rear end of the wire frame structure, and Figure 5 is a perspective view of said latch member.

In the drawings and referring more in detail to the figures wherein there is shown a preferred embodiment of the invention in which a wire frame or metal strip structure 75 is adapted to removably receive a bait plug 76. The frame structure and plug bait being generally indicated.

The wire frame structure 75 includes a length of wire 77 bent intermediate its ends to provide parallel depending leg portions 78 which are connected by a loop 79 to facilitate the attachment of a conventional multi-barbed fish hook 80 by means of a swivel connection or link 81. The forward end of the wire 77 is provided with an eye 82 for receiving a fish line leader 83, and similarly, the rear end of the wire is provided with an eye 84 to which is attached the eye 85 of a conventional multi-barbed fish hook 86.

Mounted on the front end of the wire frame structure 77 is a pair of spaced washers 88 and 89, between which is mounted a coil spring 90 with the ends thereof in abutting relation with the respective washers.

The removable bait plug 76 includes a body portion 91 of round section having a longitudinal slot 92 extending inwardly from the belly thereof to a point coincident with the axial center as shown in Figure 2. The nose 93 of the plug body 91 is inclined forwardly and downwardly and is provided with a nose plate 94 which is held in place by a screw or the like 95. The nose plate is of circular shape and is provided with a radially extending slot 96 to accommodate the wire frame structure 7.

Mounted on the rear end of the plug body 91 is a bracket 98 which is slightly curved to form a continuation of the tapered tail portion of the plug body 91. Said bracket is held in place by means of a screw 99, and the rear end of the bracket is bent downwardly as at 100 and is cut to provide a pair of rearwardly extending projections 101 and an intermediate forwardly extending projection 102, the forwardly extending projection being received in the slot 92 of the plug body, while the rearwardly extending projections 101 are arranged on opposite sides of the axial center line and form a seat for receiving the eye 84 on the rear end of the wire frame structure 77.

In operation, the wire frame structure 77 is held in one hand, while the plug bait body 91 is held in the other so that the plug body may be presented with its front end foremost to the wire frame structure 77 for engaging the yielding washer 89. When a portion of the wire frame structure 77 is received in the slot 92, a forward pressure is exerted on the plug body 91 so as to compress the spring 90 and permit the rearwardly extending projections 101 to clear the eye 84. By then releasing the pressure, the rearwardly extending projections 101 will seat beneath the eye 84 and the coil spring 90 will hold said projections in their seated position.

When removing or interchanging the plug bait body 91, a forward pressure is exerted on the plug bait body so as to compress the coil spring 90 and permit the projections 101 to slide past the eye 84.

It is to be understood that the form of the invention herewith shown and described is to be taken as the preferred embodiments thereof, and that various changes in the shape, size and arrangement of parts may be resorted to without departing from the spirit of the invention or the scope of the subjoined claim.

I claim:

In a plug bait, a longitudinally extending skeleton frame structure provided with a pair of parallel leg portions, a loop interconnecting said leg portions together and adapted to support a fishhook, an eye arranged on the front end of said frame and adapted to be attached to a fish line, an eye arranged on the rear end of said frame for supporting a fishhook, a pair of spaced washers mounted on the front end of said frame, a coil spring circumposed on said frame and interposed between said pair of washers, a bait body having a longitudinal slot extending from the belly to the axial center of said body for receiving therein said frame, the front end of said body being inclined forwardly and downwardly and the rear end of said body being circumferentially tapered inwardly of the plane of the belly of the said body, a plate secured to the front end of said body and having a slot for the projection therethrough of said frame, a bracket secured to the rear end of said body and following the contour thereof, an intermediate forwardly extending projection on the bracket adapted to be received in the slot in the body and a pair of spaced parallel projections extending rearwardly from said bracket and following the contour of the rear end of said body for engagement with the eye on the rear of said frame.

JAY S. STONE.

REFERENCES CITED

The following references are of record in the file of this patent:

UNITED STATES PATENTS

| Number | Name | Date |
|---|---|---|
| 1,140,279 | Myers | May 18, 1915 |
| 1,609,165 | Gilmore | Nov. 30, 1926 |
| 1,783,598 | Bamford | Dec. 2, 1930 |
| 1,851,698 | Fitch | Mar. 29, 1932 |
| 2,127,639 | Breuer | Aug. 23, 1938 |
| 2,190,449 | Goldammer | Feb. 13, 1940 |
| 2,295,292 | Rogers | Sept. 8, 1942 |
| 2,470,861 | Prentice | May 24, 1949 |